US008224765B2

(12) United States Patent
Khalak et al.

(10) Patent No.: US 8,224,765 B2
(45) Date of Patent: Jul. 17, 2012

(54) METHOD FOR COMPUTING THE RELATIVE LIKELIHOOD OF FAILURES

(75) Inventors: Asif Khalak, Phoenix, AZ (US); C. Arthur Dins, Minneapolis, MN (US); Bradley John Barton, Albuquerque, NM (US); David Michael Kolbet, Scottsdale, AZ (US); Qingqiu Ginger Shao, Oro Valley, AZ (US); Randy Magnuson, Scottsdale, AZ (US)

(73) Assignee: Honeywell International Inc., Morristown, NJ (US)

(*) Notice: Subject to any disclaimer, the term of this patent is extended or adjusted under 35 U.S.C. 154(b) by 739 days.

(21) Appl. No.: 12/366,475

(22) Filed: Feb. 5, 2009

(65) Prior Publication Data

US 2010/0198771 A1    Aug. 5, 2010

(51) Int. Cl.
*G06F 11/30* (2006.01)
*G06N 5/02* (2006.01)

(52) U.S. Cl. ......................................................... 706/52
(58) Field of Classification Search ................... 706/15, 706/20, 52; 702/35, 81, 115
See application file for complete search history.

(56) References Cited

U.S. PATENT DOCUMENTS

| | | | |
|---|---|---|---|
| 5,465,321 A | 11/1995 | Smyth | |
| 5,661,668 A | 8/1997 | Yemini et al. | |
| 5,950,147 A | 9/1999 | Sarangapani et al. | |
| 5,987,399 A | 11/1999 | Wegerich et al. | |
| 6,119,111 A | 9/2000 | Gross et al. | |
| 6,353,815 B1 | 3/2002 | Vilim et al. | |
| 7,050,935 B1 | 5/2006 | Draber | |
| 7,080,290 B2 | 7/2006 | James et al. | |
| 2004/0078171 A1* | 4/2004 | Wegerich et al. | 702/188 |
| 2010/0088538 A1* | 4/2010 | Kolbet et al. | 714/1 |

OTHER PUBLICATIONS

H. Guo et al., "Automatic Creation of Markov Models for Reliability Assessment of Safety Instrumented Systems," Reliability Engineering & System Safety, vol. 93, No. 6, Jun. 2008, pp. 807-815.
U.S. Appl. No. 12/366,472, titled "Fault Splitting Algorithm," filed Feb. 5, 2009.
USPTO Office Action for U.S. Appl. No. 12/366,472; Notification Date Sep. 19, 2011.
Notice of Allowance and Fee(s) Due; U.S. Appl. No. 12/366,472, Date Mailed Jan. 13, 2012.

* cited by examiner

*Primary Examiner* — Alan Chen
*Assistant Examiner* — Ola Olude Afolabi
(74) *Attorney, Agent, or Firm* — Ingrassia Fisher & Lorenz, P.C.

(57) ABSTRACT

A method for determining relative likelihood of a failure mode is provided. The method comprises receiving evidence observations of a monitored system from monitors connected in a many-to-many relationship to the failure modes, generating a fault condition including states of all failure modes that are connected to the monitors, and computing a relative probability of failure for each failure mode. The fault condition is generated for a reference model of the monitored system and is based on the received evidence observations. The relative probability of failure for each failure mode is based on a false alarm probability, a detection probability, and a ratio of prior probabilities of a candidate hypothesis to a null hypothesis of no active failure mode.

16 Claims, 3 Drawing Sheets

METHOD FOR COMPUTING THE RELATIVE LIKELIHOOD OF FAILURES

GOVERNMENT LICENSE RIGHTS

The U.S. Government may have certain rights in the present invention as provided for by the terms of Government Contract # W56HZV-05-C-0724 with the Army.

CROSS REFERENCE TO RELATED APPLICATIONS

This application is related to U.S. patent application Ser. No. 12/366,472, having a title of "FAULT SPLITTING ALGORITHM" filed on the same date herewith. The Ser. No. 12/366,472 application is hereby incorporated herein by reference.

BACKGROUND

In preventive maintenance and mission planning, it is important to calculate the likelihood of failures in a monitored system as symptoms (evidence) are observed. Since many failures frequently have overlapping evidence, it is often the case that ambiguity in fault reasoning will exist when trying to find the root cause failure. The ambiguity can lead to uncertainty in determining a root cause for a failure. For example, the ambiguity can indicate that two system components have failed but there is no way to determine if one or the other or both are the true cause of a fault without the use of complex, and thus expensive, software.

SUMMARY

The present application relates to a method for determining relative likelihood of a failure mode. The method includes receiving evidence observations of a monitored system from monitors connected in a many-to-many relationship to the failure modes, generating a fault condition including states of all failure modes that are connected to the monitors, and computing a relative probability of failure for each failure mode. The fault condition is generated for a reference model of the monitored system and is based on the received evidence observations. The relative probability of failure for each failure mode is based on a false alarm probability, a detection probability, and a ratio of prior probabilities of a candidate hypothesis to a null hypothesis of no active failure mode.

DRAWINGS

In accordance with common practice, the various described features are not drawn to scale but are drawn to emphasize features relevant to the present invention. Like reference characters denote like elements throughout figures and text.

DETAILED DESCRIPTION

Figure 1:
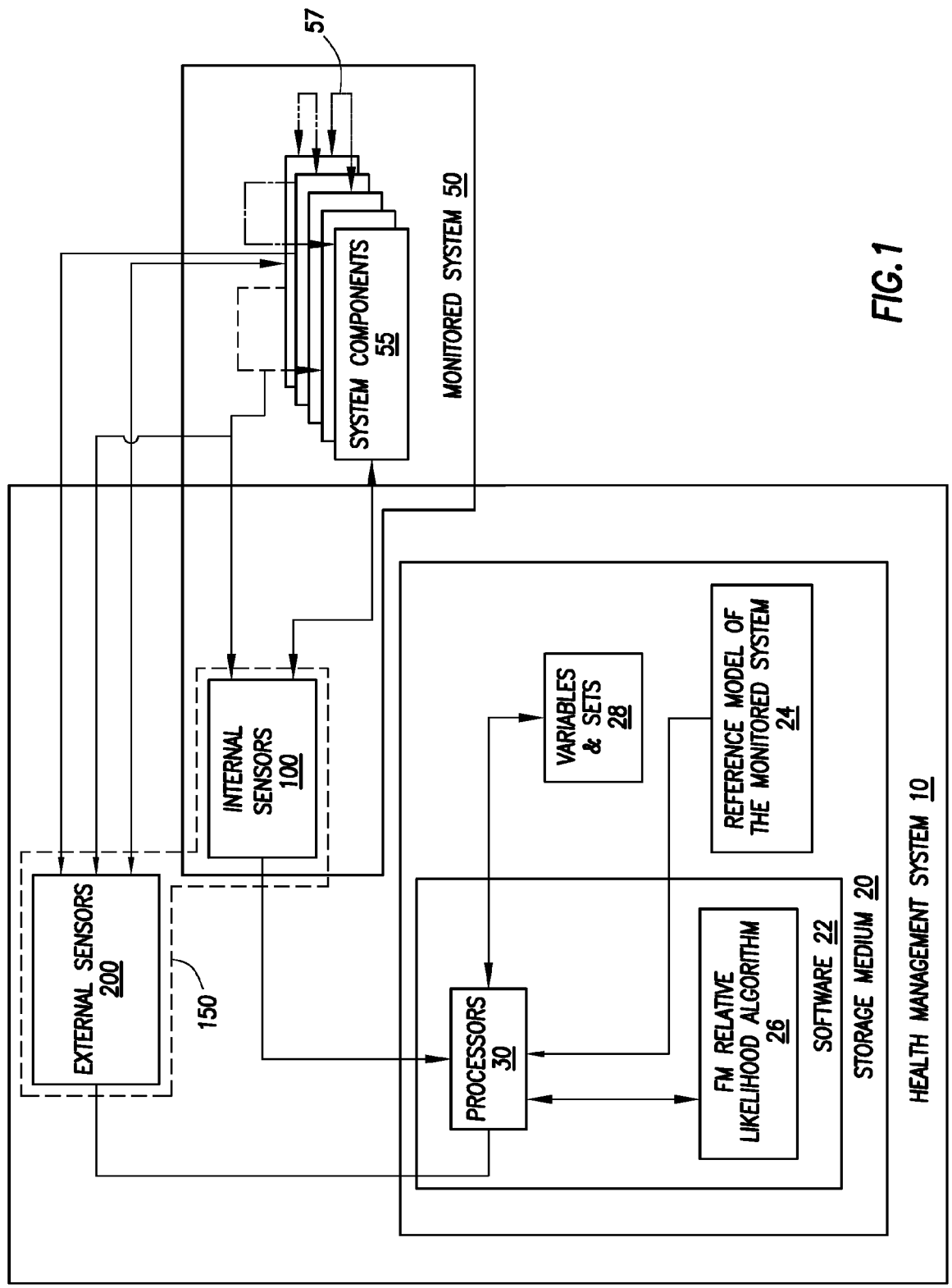
FIG. 1 is a block diagram of one embodiment of a health management system and a monitored system in accordance with the present invention.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

There is often ambiguity in reasoning to determine a root cause failure in a monitored system. The failure-mode-relative-likelihood algorithm described herein computes the probability of a hypothesized pattern of failure modes (that are based on given evidence observations) relative to a null hypothesis of no active failure modes to determine the relative probability of failure for each failure mode in the monitored system. As defined herein, the hypothesized pattern of failure modes is a candidate hypothesis. Many possible candidate hypotheses are evaluated when determining the relative probability of failure for each failure mode in the monitored system.

The failure-mode-relative-likelihood algorithm described herein solves a binary many-to-many probabilistic fault isolation problem in which many elements of evidence can suggest a single failure mode and conversely, each element of evidence can suggest multiple failure modes. Moreover, the failure-mode-relative-likelihood algorithm described herein uses the evidence observed and known system relationships to calculate a likelihood of a failure occurrence. This algorithm improves isolation of failures physically present at the time of diagnosis.

The failure-mode-relative-likelihood algorithm uses probability theory in a rigorous manner to resolve two primary complications of the reasoning tasks. First, the failure-mode-relative-likelihood algorithm resolves a situation in which there are many elements of evidence that suggest the same failure mode, and in which some of the elements disagree. Second, the failure-mode-relative-likelihood algorithm can be used to determine which failure mode exists when the elements of evidence suggest multiple failure modes. In some cases, more than one failure mode is responsible for a failure in the monitored system. In this case, the failure-mode-relative-likelihood algorithm is implemented to resolve for the plurality of failure modes as is described in detail in the H0020307-5548 application, which is incorporated herein by reference. The failure-mode-relative-likelihood algorithm is a combination of a Noisy-OR model and a naïve Bayesian reasoner. The failure-mode-relative-likelihood algorithm is in model-based software that uses a reference model of the monitored system, which is referred to herein as a vehicle.

The reference model of the vehicle (monitored system) models all critical aspects of the vehicle including the electronics, the physical structure of the parts of the vehicle, the connectivity between the parts of the vehicle, the function provided by each part of the vehicle, and the kinds of failures each part can experience. The model correlates information indicative of failures from sensors. The sensors are connected in a many-to-many relationship to the failure modes. The sensors are Boolean YES or NO (alternatively referred to as ON or OFF) monitors that output a binary indication of the state of the monitored aspect of the reference model. In this manner, the sensors provide a statement of evidence from a lower level component in the vehicle obtained during a built-in test of the components, parts, connections, etc. If a sensor is tripped, there is a condition of interest (e.g., the temperature is too high, a pressure on a part is too high, a connection between parts is broken, etc).

As defined herein, the "relative probability" is the probability normalized by the probability of a null hypothesis in which there are no active failure modes in the fault condition. The relative probability of a candidate hypothesis is used to determine a relative probability of a failure mode. Thus, the relative probability of a candidate hypothesis is the probability of the candidate hypothesis normalized by the probability of a null hypothesis. Likewise, the relative probability of a failure mode is the probability of the failure mode normalized by the probability of a null hypothesis. In one implementation of this embodiment, the monitored system is an aircraft. In another implementation of this embodiment, the monitored system is a land vehicle or water-based vehicle.

Table 1 shows the variables and datasets that define the problem.

TABLE 1

Names of variables and sets

| Name | Explanation |
| --- | --- |
| FC | Vector variable consisting of the states of all of the failure modes in an fault condition |
| $FM_i$ | Scalar variable associated with the (binary) state of a single $i^{th}$ failure mode |
| $M_i$ | Scalar variable associated with the (binary) state of the $i^{th}$ monitor |
| $M_{ik}'$ | (hidden) state of the $i^{th}$ monitor as it relates to the behavior of the $k^{th}$ failure mode |
| $d_{ik}=$ $p(M_{ik}'=$ $1|FM_k=1)$ | Detection probability - probability that a $k^{th}$ failure mode will cause the $i^{th}$ monitor to trigger "TRUE" (i.e., "indicting") |
| $f_i$ | false alarm probability - probability that the $i^{th}$ monitor reads "TRUE" (i.e., "indicting") due to a false alarm |
| fc | Candidate hypothesis of an FC for analysis |
| $fm^a$ | Special case of an FC in which $FM_a = 1$, and $FM_{b \ne a} = 0$ |
| $fm^0$ | Special case of an FC in which $FM_i = 0$ for every i |
| R | Set of relevant monitors to the failure modes in FC |
| $F_i$ | Set of failure modes related to monitor $M_i$ |
| A | Set of active failure modes in FC |

As defined herein, a fault condition (FC) is a logical structure that includes all the failures considered to cause a part of the monitored system or connections between parts of the monitored system to fail. The fault condition is an array of failure modes that form an ambiguity group of failure modes. The relationship between failure modes and monitors is based on the manufacturing data. The manufacturing data is used to define the false alarm rate and the detection probability, which are then gradually built up over time by an implementation of a learning loop that updates the fault conditions for the hidden factor matrix. The learning loop is a case-based reasoning or fixed algorithm.

The prior art reasoning systems used to determine the probability of a failure mode assume the failure modes that contribute to the tripping of a particular monitor are known. However, there may be one or more failure modes that are not modeled or one or more environmental factors that are not modeled that could cause the monitor to trip. The failure-mode-relative-likelihood algorithm accounts for such unknown factors in a hidden state ($M_{ik}'$) of a monitor. As defined herein, the hidden state of a monitor ($M_{ik}'$) is an unknown external influence that may cause the monitor to behave the way it is behaving. The hidden state of a monitor is represented by the false alarm probability $f_i$, which is the probability that the $i^{th}$ monitor reads "TRUE" (i.e., "indicting") due to a false alarm. The detection probability $d_{ik}$ is the probability that a $k^{th}$ failure mode will cause the $i^{th}$ monitor to trigger "TRUE."

The failure-mode relative likelihood L(FC=fc|M) is the relative probability of a candidate hypothesis (fc), which includes the hypothetical state for each fault in the fault condition (FC), given the monitor readings (M). The monitor readings, M, refer to evidence observations of failure modes. The term "relative probability" means that the probability is normalized by the probability of the null hypothesis, $fm^0$, in which there are no active failure modes in the fault condition FC. Equation (1) shown below is the failure-mode-relative-likelihood algorithm, which describes the probability of the fault condition existing given that some of the monitors M are triggered or ON or TRUE.

$$L(FC = fc \mid M) = \frac{p(FC = fc)}{p(FC = fm^0)} \qquad (1)$$

$$\prod_{\left\{i \mid \substack{M_i \in R \\ M_i=1}\right\}} \left[ \frac{1 - (1-f_i)\prod_{k \in A_i \cap F_i}(1-d_{ik})}{f_i} \right] \prod_{\left\{i \mid \substack{M_i \in R \\ M_i=0}\right\}} \left[ \prod_{k \in A \cap Fi}(1-d_{ik}) \right]$$

The relative probability of a candidate hypothesis of the states of each fault in the fault condition, i.e., L(FC=fc|M), includes three factors: Pr, Tr, and Q.

$$Pr = \frac{p(FC = fc)}{p(FC = fm^0)}$$

and is the ratio of the prior probabilities of the candidate hypothesis, fc, to the null hypothesis, $fm^0$.

$$Q = \prod_{\left\{i \mid \substack{M_i \in R \\ M_i=0}\right\}} \left[ \prod_{k \in A \cap Fi}(1-d_{ik}) \right]$$

and is associated with the "quiescent" monitors in the fault condition ($M_i=0$). The "quiescent" or "untriggered" monitors are also defined herein as being OFF. The factor Q is the probability that the quiescent monitors originated from the candidate hypothesis normalized by the probability that the quiescent monitors resulted from the null hypothesis. In other words, the factor Q is the probability that the OFF monitors are expected to read OFF (i.e., "exonerating") when the hypothesis is true.

$$Tr = \prod_{\left\{i \mid \substack{M_i \in R \\ M_i=1}\right\}} \left[ \frac{1 - (1-f_i)\prod_{k \in A_i \cap F_i}(1-d_{ik})}{f_i} \right]$$

and is associated with the "triggered" monitors in the fault condition ($M_i=1$). The "triggered" monitors are also defined herein as being ON. The factor Tr is the probability that the triggered monitors originated from the hypothesized fault condition normalized by the probability that the triggered monitors originated from the null hypothesis.

The factor Tr is a ratio of two probabilities, T1/T2, where:

$$T2 = \prod_{\left\{i \middle| \begin{matrix} M_i \in R \\ M_i = 1 \end{matrix}\right\}}$$

$f_i$, and is the probability that all of the "triggered" monitors are consistent with the null hypothesis (i.e., they are all false alarms).

$$T1 = \prod_{\left\{i \middle| \begin{matrix} M_i \in R \\ M_i = 1 \end{matrix}\right\}} 1 - (1-f_i) \prod_{k \in A_i \cap F_i} (1-d_{ik})$$

and is the probability that all of the "triggered" monitors are consistent with the candidate hypothesis, fc. That is, all the "triggered" monitors are triggered by failure modes in the candidate hypothesis.

FIG. 1 is a block diagram of one embodiment of a health management system 10 monitoring a monitored system 50 in accordance with the present invention. The monitored system 50 includes at least one system component 55, and internal sensors 100, also referred to herein as monitors 100. The health management system 10 includes sensors represented generally at 150, at least one processor 30, and a storage medium 20 to store software 22 executable by the at least one processor 30. The sensors 150 include both the internal sensors 100 in the monitored system 50, and external sensors 200, which are external to the monitored system 50. The health management system 10 is configured to determine relative probabilities of failure in a monitored system 50. The at least one processor 30 is referred to herein as the processors 30. The sensors 150, internal sensors 100, and external sensors 200 are also referred to herein as monitors 150, internal monitors 100, and external monitors 200, respectively.

Some of the system components 55 are connected to others of the system components 55 via connections represented generally at 57. The connections can be wired or wireless. The sensors 150 are communicatively coupled to the system components 55 to monitor the system components 55. Likewise, the sensors 150 are communicatively coupled to each of the connections 57 between the various system components 55 to monitor the linking between two system components. In one implementation of this embodiment, the sensors 150 also monitor the environment of the monitored system 50.

The sensors 150 are communicatively coupled to output evidence observations that are generated during the monitoring to the processors 30. The processors 30 received the evidence observations from the sensors 150. The processors 30 generate an array of failure modes that form the ambiguity group of failure modes based on the evidence observations received from the sensors 150. The processors 30 also execute algorithms in the software 22 configured to generate information regarding unknown causes of failures.

The software 22 stored in the storage medium 20 includes a failure-mode-relative-likelihood algorithm 26 stored in the storage medium 20. As shown in FIG. 1, the processors are in the software 22. The failure-mode-relative-likelihood algorithm 26 (shown above as equation (1)) is a combination of noisy-OR models and a naïve Bayesian reasoner. A reference model of the monitored system 24 is stored in the storage medium 20. In one implementation of this embodiment, the storage medium also stores variables and sets 28 generated by the processors 30. For example, the scalar and vector variables 28 shown in Table 1 are stored in the storage medium 20.

In one implementation of this embodiment, the monitored system 50 is an aircraft. In another implementation of this embodiment, the monitored system is a land vehicle. The processors 30 execute software 22 and/or firmware that causes the processors 30 to perform at least some of the processing described here as being performed by the health management system 10. At least a portion of such software 22 and/or firmware executed by the processors 30 and any related data structures are stored in storage medium 20 during execution. In one implementation of this embodiment, the processors 30 include a memory (not shown) that comprises any suitable memory now known or later developed such as, for example, random access memory (RAM), read only memory (ROM), and/or registers within the processors 30. In one implementation, the processors 30 comprise microprocessors or microcontrollers. The software 22 and/or firmware executed by the processors 30 comprises a plurality of program instructions that are stored or otherwise embodied on a storage medium 20 from which at least a portion of such program instructions are read for execution by the processors 30. In one implementation, the processors 30 comprise processor support chips and/or system support chips such as application-specific integrated circuits (ASICs).

Figure 2:
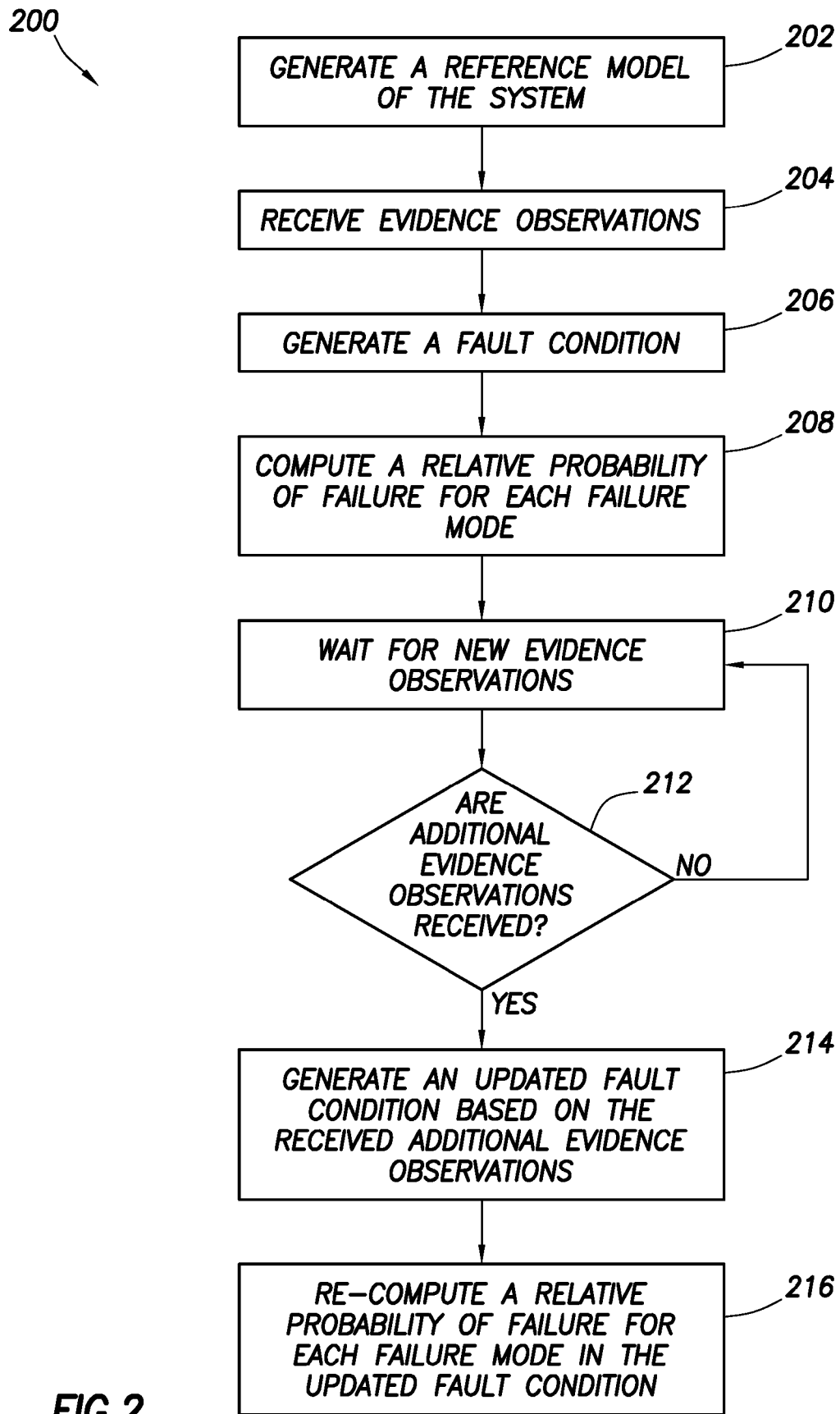
FIG. 2 is a flow diagram of an embodiment of a method for determining relative likelihood of a failure mode in accordance with the present invention.

FIG. 2 is a flow diagram of an embodiment of a method 200 for determining relative likelihood of a failure mode in accordance with the present invention. FIG. 2 is a flow diagram for a method 200 of determining relative likelihood of a failure mode based on initial data for a reference model of the monitored system In one embodiment, the method 200 is implemented by the health management system 10 to monitor the monitored system 50 shown in FIG. 1 although it is to be understood that method 200 can be implemented using other embodiments of the monitored system 50 and the health management system 10 as is understandable by one skilled in the art who reads this document.

Referring now to FIG. 2, at block 202, a reference model of the monitored system 50 is generated by the processors 30. The reference model can be generated based on data received from vendors of the system components 55, as well as from test data taken during a build of the monitor system 50. In one implementation of this embodiment, the reference model of the monitored system 50 is generated by the processors 30. In another implementation of this embodiment, the reference model of the monitored system 50 is generated external to the health management system 10 and is downloaded into the health management system 10.

At block 204, evidence observations of a monitored system are received from sensors 150 at the processors 30. The sensors 150 are connected in a many-to-many relationship to the failure modes.

At block 206, a fault condition comprising states of all failure modes for a reference model of the monitored system 50 is generated based on the received evidence observations. The fault condition is an ambiguity group of failure modes. The processors 30 implement model-based software 22 to generate the fault condition for the states-of-failure modes for the reference model of the monitored system 50.

At block 208, a relative probability of failure for each failure mode is computed based on three factors. These three factors include the false alarm probability, the detection probability, and the ratio of prior probabilities of the candidate hypothesis to a null hypothesis of no active failure modes. Thus, at least one processor 30 generates the ratio of the prior probabilities of each candidate hypothesis to the null hypothesis, generates a trigger factor associated with triggered monitors in the fault condition, and generates a quiescent factor associated with quiescent monitors in the fault condition. The manner by which these factors are generated is described below with reference to method 300 of FIG. 3.

At block 210, the health management system 10 waits to receive additional evidence observations. If no additional evidence observations are received, then none of the sensors 150 are triggered by a change in state of the monitored system 50. At block 212, it is determined if additional evidence observations were received. If no additional evidence observations were received, the health management system 10 maintains a waiting state by looping from block 210 to block 212 and back to block 210 until additional evidence observations are received. If additional evidence observations were received, the flow proceeds to block 214.

At block 214, an updated fault condition comprising states of all failure modes for a reference model of the monitored system is generated based on the additional evidence observations received from the sensors 150. An updated ambiguity group of failure modes is formed from the updated fault condition. The processors 30 implement model-based software 22 to generate the updated fault condition for the states-of-failure modes for the reference model of the monitored system.

At block 216, a relative probability of failure for each failure mode in the updated fault condition is re-computed based on three factors. These three factors include the false alarm probability, the detection probability, and the ratio of prior probabilities of the candidate hypothesis to a null hypothesis of no active failure modes.

Thus, at least one processor 30 regenerates a trigger factor associated with triggered monitors in the updated fault condition, regenerates a quiescent factor associated with quiescent monitors in the updated fault condition, and regenerates the ratio of the prior probabilities of each candidate hypothesis to the null hypothesis. The processors 30 then determine the relative probability of failure based on the regenerated trigger factor, quiescent factor, and ratio of the prior probabilities of the candidate hypothesis to the null hypothesis. The manner by which these factors are regenerated is described below with reference to method 300 of FIG. 3.

Figure 3:
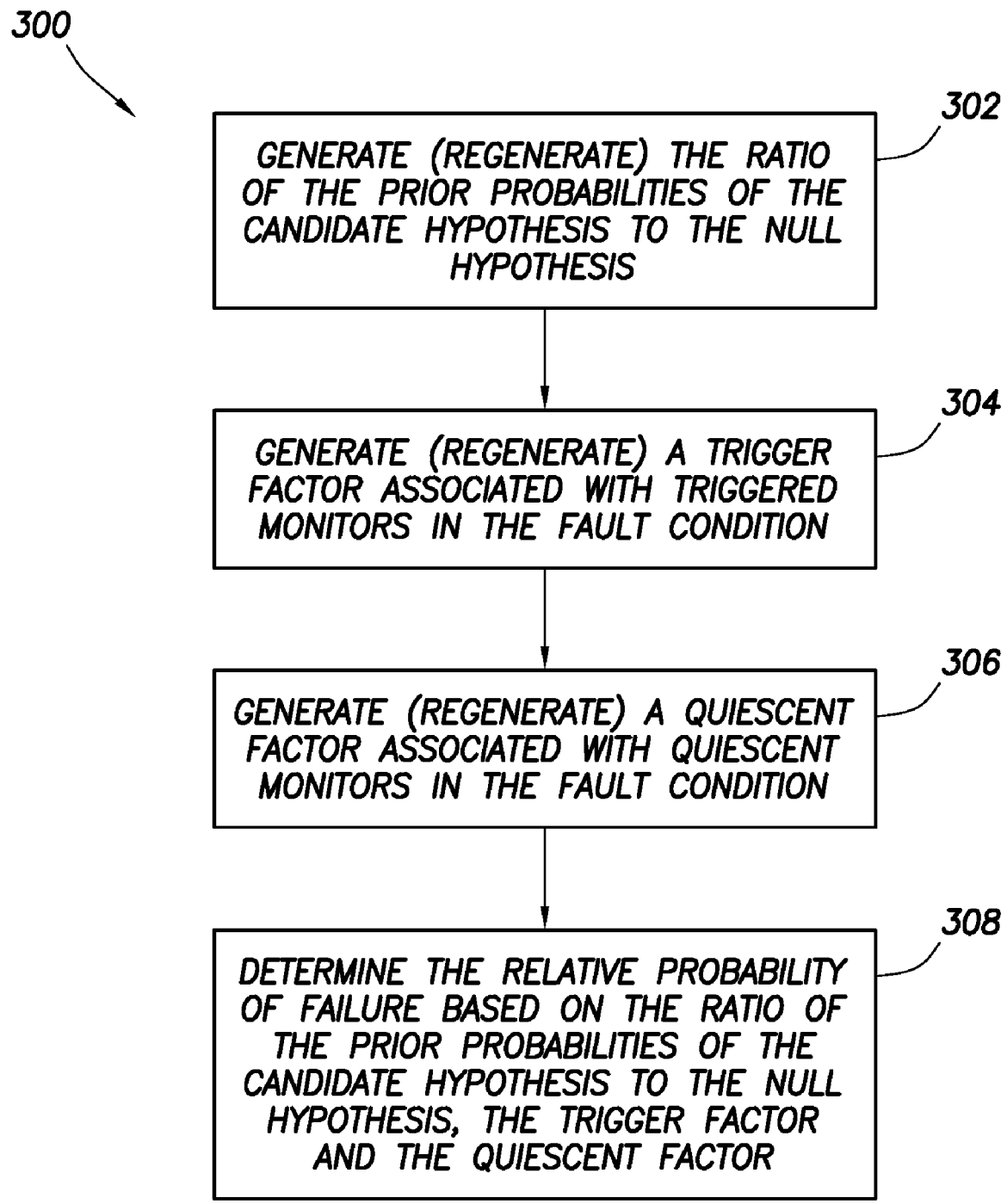
FIG. 3 is a flow diagram of an embodiment of a method for computing a relative probability of failure for each failure mode in accordance with the present invention.

FIG. 3 is a flow diagram of an embodiment of a method 300 for computing a relative probability of failure for each failure mode in accordance with the present invention. The method 300 for computing a relative probability of failure is an expansion of the details described above with reference to block 208 of method 200 in FIG. 2. In the following description, by reading the terms in parentheses in place of the terms just prior to the terms in parentheses, method 300 is applicable to a method for re-computing a relative probability of failure for each failure. The method for re-computing a relative probability of failure is an expansion of the details described above with reference block 216 of method 200 in FIG. 2.

At block 302, the processors 30 generate (regenerate) the ratio of the prior probabilities of each candidate hypothesis in the fault condition to the null hypothesis. At block 304, the processor 30 generates (regenerates) the trigger factor Tr associated with the triggered monitors in the fault condition by generating (regenerating) the probability that the triggered monitors originated from the hypothesized fault condition normalized by the probability that the triggered monitors resulted from the null hypothesis. The trigger factor Tr includes the false alarm probability $f_i$ and the detection probability $d_{ik}$.

At block 306, the processor 30 generates (regenerate) the quiescent factor Q associated with the quiescent monitors in the fault condition by generating (regenerating) the probability that the quiescent monitors originated from the candidate hypothesis normalized by the probability that the quiescent monitors resulted from the null hypothesis. The quiescent factor Q includes the detection probability $d_{ik}$.

At block 308, the processors 30 determine the relative probability of failure based on the ratio of the prior probabilities of the candidate hypothesis to the null hypothesis, the trigger factor, and the quiescent factor.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

We claim:

1. A method for determining relative likelihood of a failure mode, the method comprising:
   receiving evidence observations of a monitored system from monitors connected in a many-to-many relationship to the failure modes;
   generating a fault condition including states of all failure modes that are connected to the monitors, the fault condition being generated for a reference model of the monitored system based on the received evidence observations; and
   computing a relative probability of failure for each failure mode based on a false alarm probability, a detection probability, and a ratio of prior probabilities of a candidate hypothesis to a null hypothesis of no active failure modes.

2. The method of claim 1, wherein computing a relative probability of failure for each failure mode comprises:
   generating the ratio of the prior probabilities of the candidate hypothesis relative to the null hypothesis;
   generating a trigger factor associated with triggered monitors in the fault condition;
   generating a quiescent factor associated with quiescent monitors in the fault condition; and
   determining the relative probability of failure based on the ratio of the prior probabilities of the candidate hypothesis to the null hypothesis, the trigger factor, and the quiescent factor.

3. The method of claim 2, wherein generating the trigger factor associated with the triggered monitors in the fault condition comprises:
   generating a probability that the triggered monitors originated from the hypothesized fault condition normalized by a probability that the triggered monitors resulted from the null hypothesis.

4. The method of claim 2, wherein generating the quiescent factor associated with the quiescent monitors in the fault condition comprises:
   generating a probability that the quiescent monitors originated from the candidate hypothesis normalized by a probability that the quiescent monitors resulted from the null hypothesis.

5. The method of claim 1, further comprising:
   receiving additional evidence observations from the monitors;
   generating an updated fault condition based on the received additional evidence observations; and
   re-computing a relative probability of failure for each failure mode in the updated fault condition.

6. The method of claim 5, wherein re-computing a relative probability of failure for each failure mode comprises:
   regenerating the ratio of the prior probabilities of each candidate in the updated fault condition to the null hypothesis;
   regenerating a trigger factor associated with triggered monitors in the updated fault condition;
   regenerating a quiescent factor associated with quiescent monitors in the updated fault condition; and
   determining the relative probability of failure based on the ratio of the regenerated prior probabilities of the candidate hypothesis to the null hypothesis, the regenerated trigger factor, and the regenerated quiescent factor.

7. The method of claim 6, wherein regenerating the trigger factor associated with the triggered monitors in the updated fault condition comprises:
   regenerating a probability that the triggered monitors originated from the hypothesized fault condition normalized by a probability that the triggered monitors resulted from the null hypothesis; and
   wherein regenerating the quiescent factor associated with the quiescent monitors in the updated fault condition comprises:
      regenerating a probability that the quiescent monitors originated from the candidate hypothesis normalized by a probability that the quiescent monitors resulted from the null hypothesis.

8. The method of claim 1, further comprising:
   generating the reference model of the monitored system; and
   implementing model-based software to generate the fault condition for the states-of-failure modes for the reference model of the monitored system.

9. A computer readable medium storing instructions to implement a method to:
   generate a fault condition including states of all failure modes that are connected to the monitors, the fault condition being generated for a reference model of a monitored system based on evidence observations received from monitors; and
   compute a relative probability of failure for each failure mode based on a false alarm probability, a detection probability, and a ratio of prior probabilities of a candidate hypothesis to a null hypothesis of no active failure modes.

10. The computer readable medium of claim 9, wherein the instructions further include instructions to implement a method to:
    generate an updated fault condition based on additional evidence observations received from the monitors; and
    re-compute a relative probability of failure for each failure mode in the updated fault condition.

11. The computer readable medium of claim 9, wherein the instructions to compute a relative probability of failure for each failure mode comprise instructions to implement a method to:
    generate the ratio of the prior probabilities of the candidate hypothesis relative to the null hypothesis;
    generate a trigger factor associated with triggered monitors in the fault condition; and
    generate a quiescent factor associated with quiescent monitors in the fault condition.

12. A health management system configured to determine relative probabilities of failure in a monitored system, the health management system comprising:
    sensors to monitor system states and to output evidence observations; and
    at least one processor configured to: generate a fault condition including states of all failure modes that are connected to the sensors based on the evidence observations received from the sensors for a reference model of the monitored system; and execute algorithms configured to compute a relative probability of failure for each failure mode based on a false alarm probability, a detection probability, and a ratio of prior probabilities of a candidate hypothesis to a null hypothesis of no active failure modes.

13. The health management system of claim 12, wherein the monitored system includes system components, wherein at least one system component is communicatively coupled to at least one other system component, and wherein the sensors are configured to monitor the system components and the linking between two system components.

14. The health management system of claim 12, further comprising:
    storage medium to store software executable by the at least one processor.

15. The health management system of claim 14, further comprising:
    a failure-mode-relative-likelihood algorithm stored in the storage medium.

16. The health management system of claim 14, further comprising:
    a reference model of the monitored system stored in the storage medium.

* * * * *